US007004154B2

(12) United States Patent
Joyce et al.

(10) Patent No.: US 7,004,154 B2

(45) Date of Patent: Feb. 28, 2006

(54) AIR INTAKE COOLING SYSTEM AND METHOD

(75) Inventors: Stephen Joyce, Redhill (GB); Chris Whelan, Southwick (GB); Iain William Gouldson, Bishop Stortford (GB); Chris Bush, Leigh-on-Sea (GB); Noel Henderson, Munich (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 89 days.

(21) Appl. No.: 10/677,157

(22) Filed: Oct. 1, 2003

(65) Prior Publication Data

US 2005/0051145 A1 Mar. 10, 2005

(30) Foreign Application Priority Data

Oct. 4, 2002 (GB) .................................. 0222987

(51) Int. Cl.
*F02B 33/00* (2006.01)
*F02B 29/04* (2006.01)

(52) U.S. Cl. .................. 123/563; 123/559.1; 60/605.1

(58) Field of Classification Search ................ 123/563; 60/605.1, 599, 605.2; F02B 29/04; F02D 9/02
See application file for complete search history.

(56) References Cited

U.S. PATENT DOCUMENTS

| | | | | |
|---|---|---|---|---|
| 5,617,726 | A * | 4/1997 | Sheridan et al. ........... | 60/605.2 |
| 2004/0069284 | A1 * | 4/2004 | Corba ........................ | 123/563 |

FOREIGN PATENT DOCUMENTS

| | | | |
|---|---|---|---|
| DE | 34 34 173 | | 10/1985 |
| DE | 37 18 544 | A1 | 12/1988 |
| GB | 2 055 963 | A | 3/1981 |
| JP | 57 195820 | | 12/1982 |
| JP | 62048923 | A * | 3/1987 |
| JP | 62107225 | A * | 5/1987 |
| JP | 03260324 | A * | 11/1991 |
| WO | WO 93/1430 | | 7/1993 |

* cited by examiner

*Primary Examiner*—Thai-Ba Trieu
(74) *Attorney, Agent, or Firm*—Brinks Hofer Gilson & Lione

(57) ABSTRACT

The present invention relates to a method and apparatus for cooling intake air prior to entry into a combustion chamber of a boosted internal combustion engine. The invention provides an air intake system comprising a cooler disposed in an intake passage downstream of a charger; a bypass passage for communication between a portion of said intake passage located upstream of said cooler and a portion of said intake passage located downstream of said cooler so as to allow a flow of air discharged from the charger to bypass the cooler; a bypass control valve disposed in said bypass passage to open and close the bypass passage and a flow restriction disposed in the bypass passage limiting the flow in the event that the bypass control valve remains in an open position.

5 Claims, 4 Drawing Sheets

AIR INTAKE COOLING SYSTEM AND METHOD

BACKGROUND

1. Field of the Invention

The present invention relates to a method and apparatus for cooling intake air prior to entry into a combustion chamber of a boosted internal combustion engine, particularly, although not exclusively, for use in a diesel engine.

2. Description of Prior Art

Many automotive engines are boosted by compressing air prior to admission to internal combustion chambers. A turbocharger includes a turbine wheel that is driven by the exhaust gases from the engine and which in turn drives a rotary compressor. A supercharger includes a rotary compressor which is directly driven by the engine or by a motor which is ultimately powered by the engine. Diesel engines in particular are predominately turbocharged in order to increase the power of the engine.

When incoming air is compressed, it is simultaneously heated. Conventionally, the intake air is cooled by use of a charge air cooler or intercooler prior to admission to the combustion chamber.

Often such a cooler is a bypass passage so that the charge air can bypass the cooler, for example to aid engine warm up, to reduce emissions or to reduce combustion noise. The charge air is admitted to the bypass passage via a bypass valve which is controlled in accordance with various engine operating parameters. Use of a bypass passage is particularly relevant for diesel engines which usually have a charge air intake passage which is not controlled by a throttle valve in dependence upon an accelerator position.

However, a problem with such known intake air systems is that the bypass valve can malfunction and remain in an open position. This will cause all of the charge air to bypass the charge air cooler. Excessive charge air temperature at high engine loads is likely to lead to engine damage.

SUMMARY OF THE INVENTION

According to the present invention, there is provided an air intake system for an internal combustion engine comprising a cooler disposed in an intake passage downstream of a charger; a bypass passage for communication between a portion of said intake passage upstream of said cooler and a portion of said intake passage downstream of said cooler and a portion of said intake passage downstream of said cooler so as to allow a flow of air discharged from the charger to bypass the cooler; a bypass control valve disposed in said bypass passage for opening and closing said bypass passage; and flow restriction means disposed in said bypass passage for limiting said flow in the event that the bypass valve remains in an open position.

According to another aspect of the invention there is also provided a charge air cooler comprising a cooling passage; a bypass passage; a bypass control valve disposed in said bypass passage for opening and closing said bypass passage; and flow restriction means disposed in said bypass passage for limiting said flow in the event that the bypass cont5rol valve remains in an open position.

Preferably the flow restriction means comprises a flow restriction orifice dimensioned such that flow is unimpeded until a predetermined critical flow rate is achieved.

The invention also provides a method of cooling charge air using a cooler having a cooling passage and a bypass passage comprising the step of operating a bypass control valve such that the cooling passage is bypassed under particular engine operating conditions, and in which in the event of failure of the bypass control valve, the flow through the bypass passage is limited to a predetermined critical flow rate.

Embodiments of the invention will now be described, by way of example only, with reference to the accompanying drawings.

DETAILED DESCRIPTION

Figure 1:
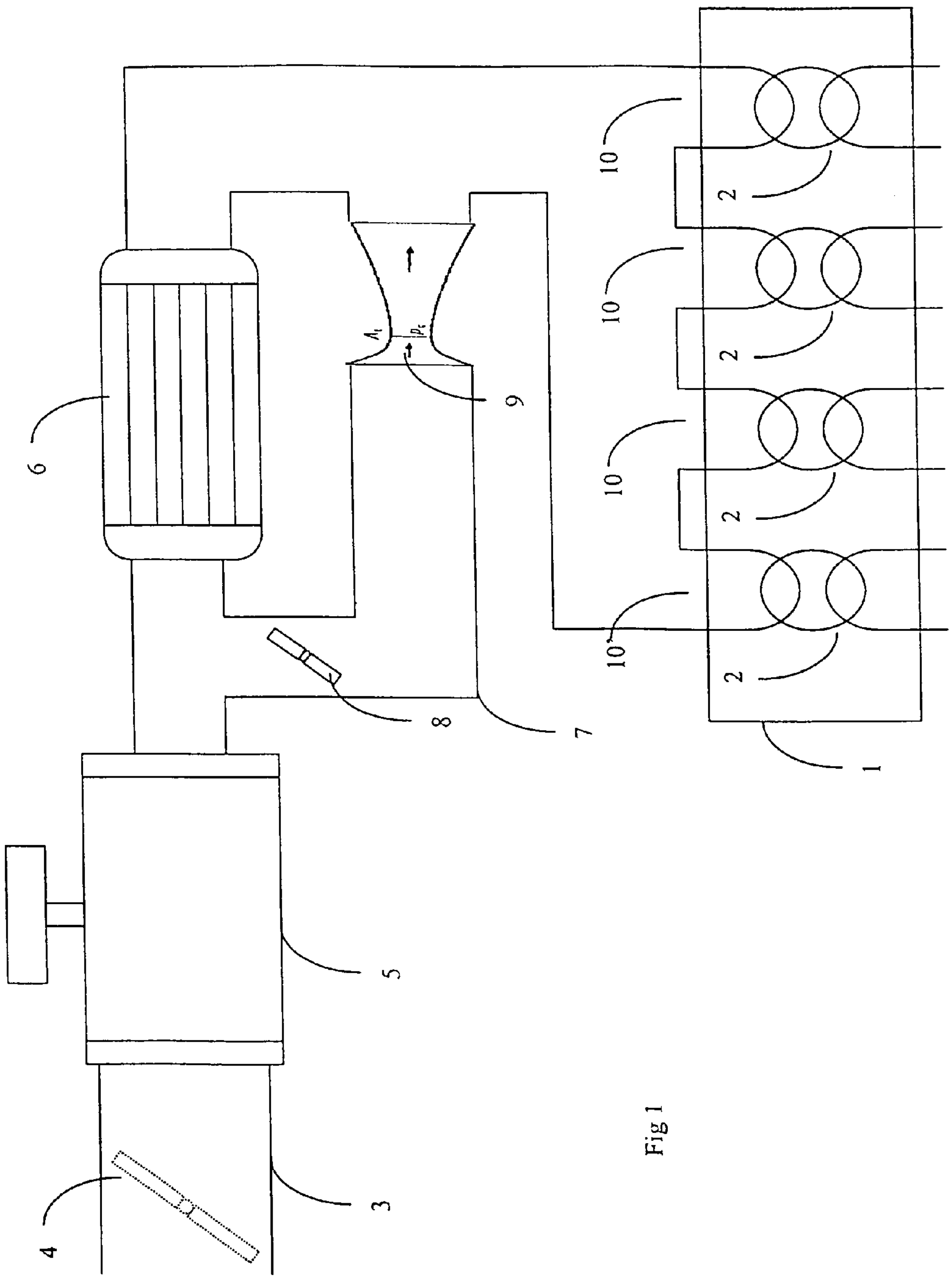
FIG. 1 illustrates schematically an air intake system according to one embodiment of the invention.

In FIG. 1, an engine 1 has a plurality of cylinders 2, in this instance there are four cylinders 2. The engine 1 has an air intake passage 3. Air intake may be regulated by a throttle valve 4, which is operated in accordance with an accelerator pedal position. It should be noted, however, that this invention is particularly relevant to diesel engines, which may have no throttle valve 4. A charger 5, which may be a turbo charger or a super charger serves to compress air prior to admission into the internal combustion chambers of the cylinders 2.

A charge air cooler 6 serves to cool the compressed air received from the charger 5. A bypass passage 7 is opened and closed using a bypass valve 8, which is operated in accordance with particular engine operating parameters. The bypass passage 7 allows uncooled air into the combustion chambers under certain circumstances.

The bypass valve 8 shown in FIG. 1 operates by opening or closing the bypass passage 7. When the bypass passage 8 is open, some air still passes through the cooler 6 via the parallel path that is still open.

The bypass valve 8 is controlled in accordance with the charge air temperature, and opens when the temperature is below a predetermined threshold. If the valve 8 is a butterfly valve then some variable control of the valve is possible. However, the flow rate varies non linearly in dependence upon the valve angle and such variable control is limited. The bypass valve 8 can be implemented by a thermostatic valve that opens in accordance with the charge air temperature.

After passing through or bypassing the charge air cooler 6, the charge air is admitted into the combustion chamber of each cylinder 2 via respective intake ports 10.

The bypass passage 7 has a flow restriction orifice 9, which is dimensioned such that below a predetermined critical flow rate there is no significant pressure loss, but above the critical flow rate the total bypass flow rate is restricted.

Ideally, the maximum bypass flow rate is limited to approximately 50% of the maximum flow for which the engine is designed. The maximum flow rate is dependent upon the cross sectional area of the orifice and on the upstream air pressure and temperature. As seen in FIGS. 1 and 2, one preferred embodiment forms the flow restriction orifice 9 through the use of a venturi.

Figure 2:
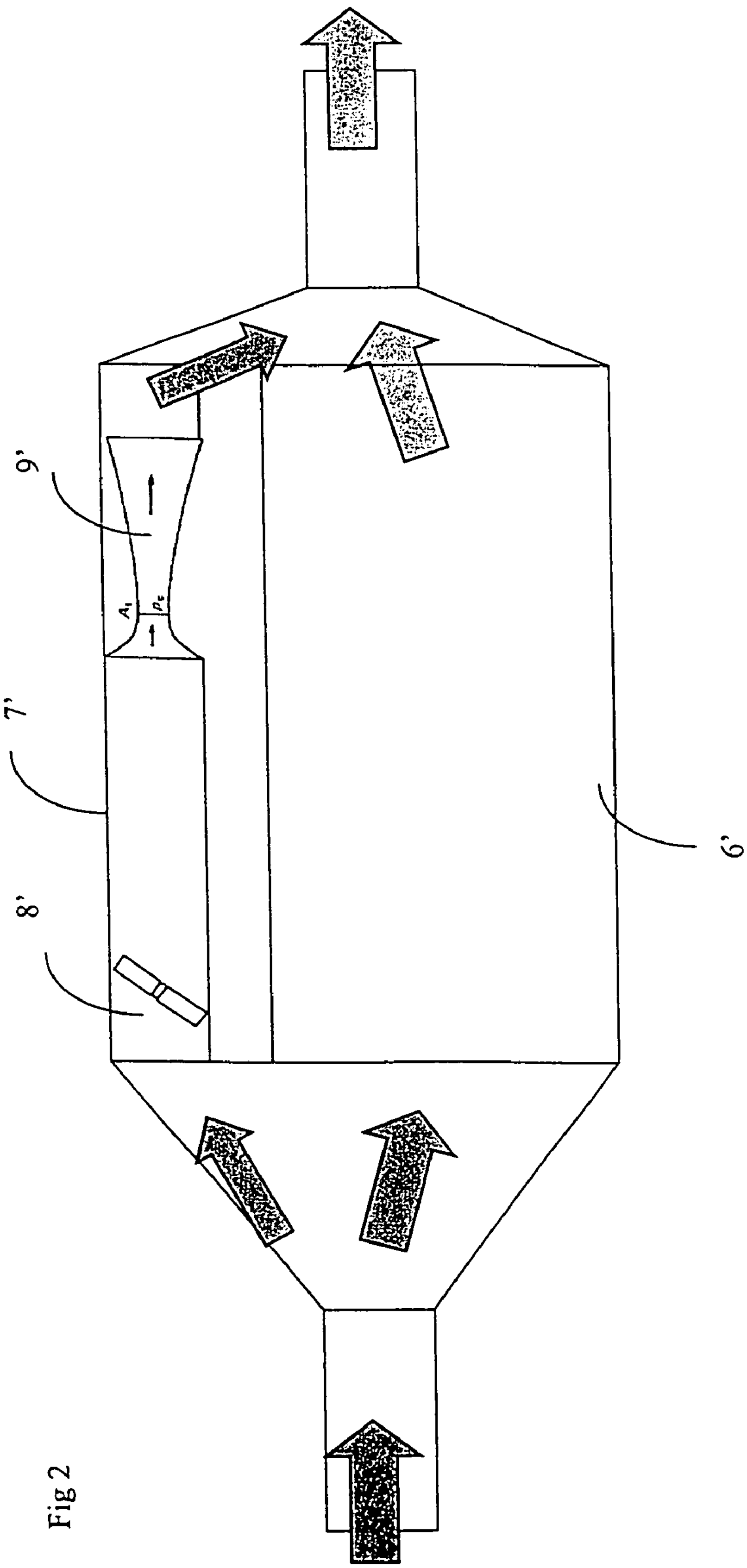
FIG. 2 illustrates schematically a charge air cooler according to a second embodiment of the invention.

As seen in FIG. 2, according to a second embodiment of the invention, a charge air cooler 6' is provided therein with a bypass passage 7', a bypass control valve 8' disposed in the bypass passage 7', and a flow restriction means 9'. The flow restriction means 9' is disposed in the bypass passage 7' to limit the flow therethrough in the event that the bypass control valve 8 remains in an open position.

Figure 3:
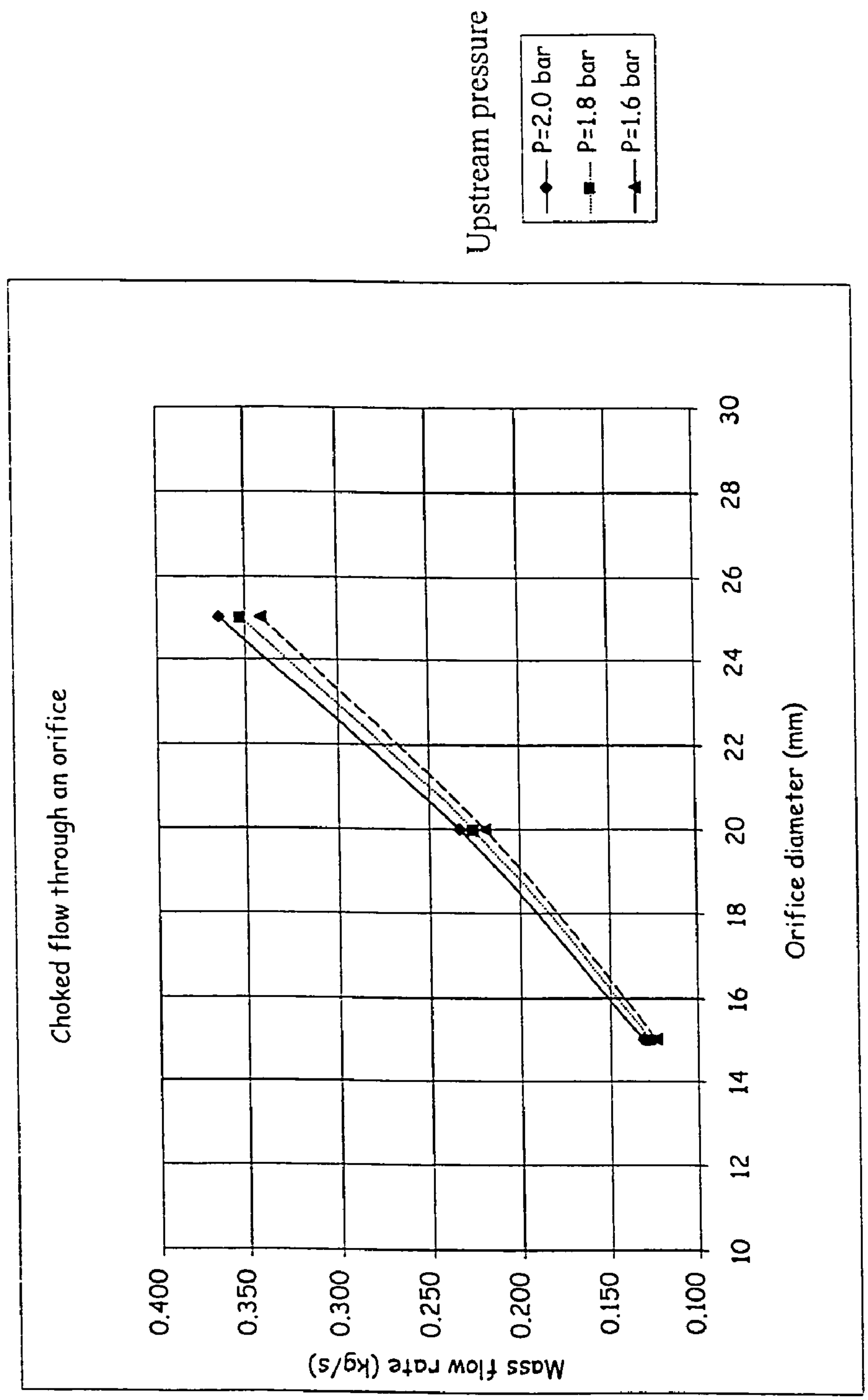
FIG. 3 is a graph which illustrates the effect of orifice diameter upon maximum flow rate for various upstream pressures.

FIG. 3 illustrates the maximum flow rate in kg/s for particular orifice diameters. This figure illustrates that increasing the upstream pressure does not have much effect upon the maximum flow rate through the orifice.

Figure 4:
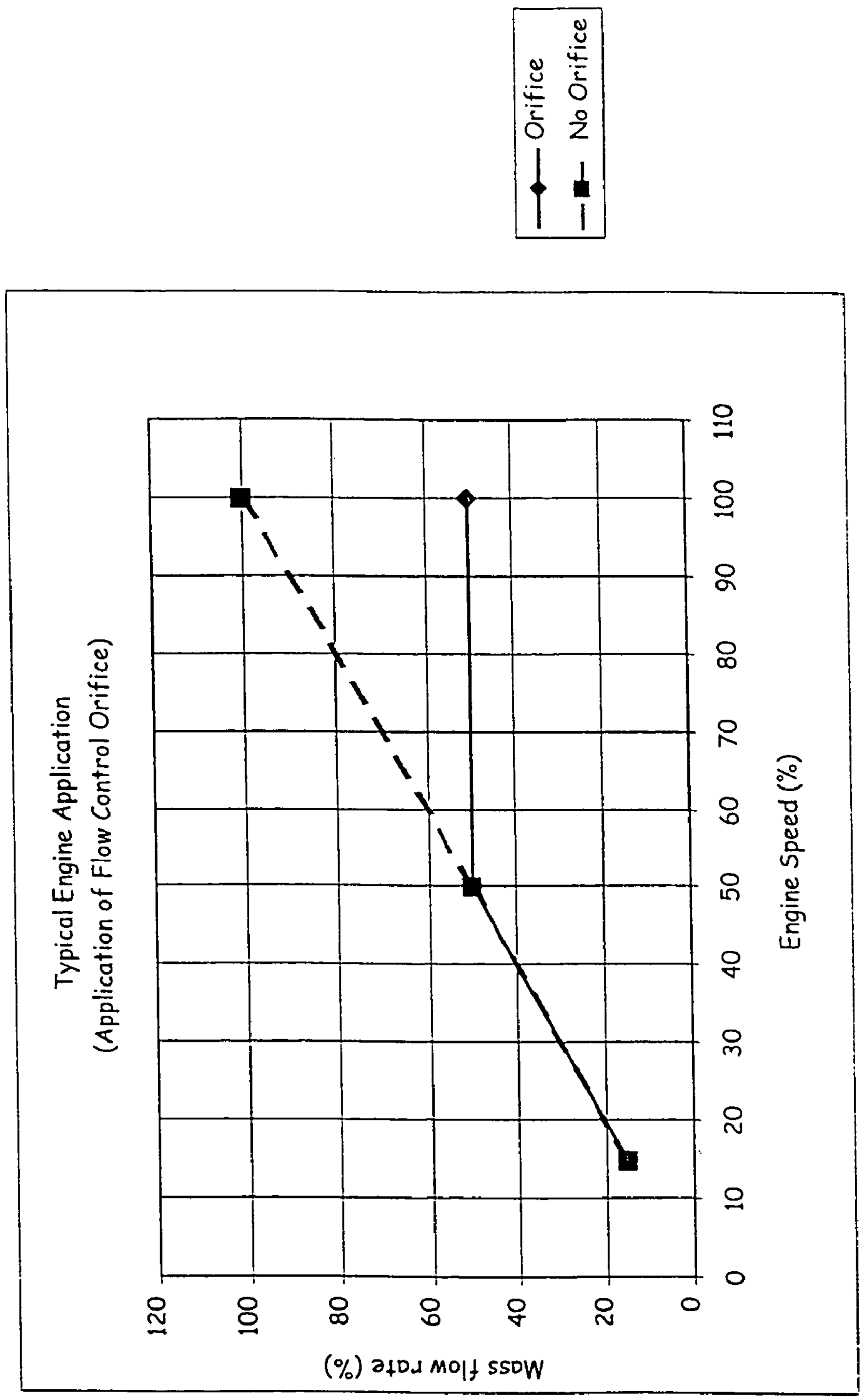
FIG. 4 is a graph illustrating the percentage flow rate through a bypass duct both with and without an orifice for various engine speeds.

FIG. 4 illustrates the percentage flow rate (shown as a percentage of the maximum flow for which the engine is designed) against the engine speed. When an orifice is present the maximum flow rate is restricted to 50% when the engine speed rises to greater that 50%.

Thus in the event that the bypass valve 8 malfunctions and admits charge air continually, the flow rate is restricted by means of the critical flow orifice 9.

The bypass passage 7 may be external to the charge air cooler, as illustrated in FIG. 1, or the bypass passage 7' may be integral to the charge air cooler 6'. The latter is illustrated in FIG. 2, in which like elements are labeled with like reference numerals distinguished with a prime. Other than being formed as an integral unit, the bypass passage 7' and the charge air cooler 6' of the second embodiment are coupled to the engine 1 and the charger 5 in the same manner as the previous embodiment It is intended that the foregoing detailed description be regarded as illustrative rather than limiting and that it be understood that it is the following claims, which are intended to define the scope of the invention.

What is claimed is:

1. A method of cooling charge air using a cooler having a cooling passage and a bypass passage comprising the steps of;

operating a bypass control valve such that the cooling passage is bypassed under particular engine operating conditions; and in which in the event of failure of the bypass control valve, limiting flow through the bypass passage at a predetermined critical flow rate.

2. A method of cooling charge air cooler according to claim 1 further comprising the step of operating a bypass control valve in response to the temperature of air emitted from a charger located upstream of the cooler.

3. A charge air cooler comprising:

a cooling passage;

a bypass passage;

a bypass control valve disposed in said bypass passage and adapted to open and close said bypass passage; and a flow restrictor disposed in said bypass passage, said flow restrictor limiting flow in the event that said bypass control valve remains in an open position, said flow restrictor comprising portions defining a flow restriction orifice dimensioned such that flow is unimpeded until a predetermined critical flow rate is achieved.

4. A charge air cooler according to claim 3 wherein said flow restriction is a venturi.

5. An air intake system for an internal combustion engine comprising:

an intake passageway;

a charger in-line with said intake passageway;

a cooler disposed in-line with said intake passage and located downstream of said charger;

a bypass passage coupled between a portion of said intake passage upstream of said cooler and a portion of said intake passage located downstream of said cooler so as to allow a flow of air discharged from said charger to bypass said cooler;

a bypass control valve disposed in said bypass passage and adapted to open and close said bypass passage; and a flow restrictor disposed in said bypass passage, said flow restrictor limiting flow through said bypass passage in the event that said bypass control valve remains in an open position, said flow restrictor comprising a flow restriction orifice dimensioned such that flow is unimpeded until a predetermined critical flow rate is achieved.

* * * * *